United States Patent
Oguni

(10) Patent No.: US 9,236,185 B1
(45) Date of Patent: Jan. 12, 2016

(54) MULTILAYER CERAMIC CAPACITOR

(71) Applicant: Murata Manufacturing Co., Ltd., Nagaokakyo-shi, Kyoto-fu (JP)

(72) Inventor: Toshimi Oguni, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/530,932

(22) Filed: Nov. 3, 2014

(51) Int. Cl.
| | |
|---|---|
| H01G 4/06 | (2006.01) |
| H01G 4/005 | (2006.01) |
| H01G 4/30 | (2006.01) |
| C04B 35/00 | (2006.01) |
| H01G 4/12 | (2006.01) |

(52) U.S. Cl.
CPC ............. *H01G 4/1209* (2013.01); *H01G 4/005* (2013.01); *H01G 4/30* (2013.01)

(58) Field of Classification Search
CPC ............................... H01G 4/30; H01G 4/1227
USPC .......... 361/321.1, 321.2, 301.4; 501/138, 139
See application file for complete search history.

(56) References Cited

U.S. PATENT DOCUMENTS

| | | | | |
|---|---|---|---|---|
| 2004/0179326 | A1* | 9/2004 | Hattori | 361/320 |
| 2006/0232911 | A1* | 10/2006 | Ito et al. | 361/321.4 |
| 2008/0164053 | A1* | 7/2008 | Matsubara et al. | 174/255 |

FOREIGN PATENT DOCUMENTS

JP 62-256422 A 11/1987

* cited by examiner

*Primary Examiner* — Eric Thomas
*Assistant Examiner* — Arun Ramaswamy
(74) *Attorney, Agent, or Firm* — Keating & Bennett, LLP

(57) ABSTRACT

A multilayer ceramic capacitor includes a ceramic laminated body including dielectric ceramic layers and internal electrodes stacked with the dielectric ceramic layers disposed therebetween. The dielectric ceramic layers contain a perovskite compound containing Ba and Ti, Zr, and a rare earth element, and ratios of Zr and the rare earth element to 100 molar parts of Ti are about 0.4 to 2.0 molar parts and about 0.05 to 0.5 molar parts, respectively. The molar ratio of Zr to the rare earth element is about 3.3 to about 8.0, and Al-containing segregated substances are present in about 80% or more of defective portions where continuity of the internal electrodes is interrupted. Dielectric ceramic constituting the dielectric ceramic layers has an average grain diameter of about 230 nm to about 350 nm.

2 Claims, 5 Drawing Sheets

MULTILAYER CERAMIC CAPACITOR

BACKGROUND OF THE INVENTION

1. Field of the Invention

The present invention relates to a multilayer ceramic capacitor and more specifically relates to a multilayer ceramic capacitor including a ceramic laminated body (capacitor body) including a plurality of dielectric ceramic layers and a plurality of internal electrodes stacked with the dielectric ceramic layers disposed therebetween.

2. Description of the Related Art

In recent years, with decreases in size and weight of electronic apparatuses, small multilayer ceramic capacitors capable of obtaining large capacity have been widely used. Multilayer ceramic capacitors widely known as such multilayer ceramic capacitors have, for example, a structure in which external electrodes are disposed on outer surfaces of a stack including a plurality of dielectric layers and a plurality of internal electrodes disposed at the interfaces between the dielectric layers so that the external electrodes are electrically connected to the internal electrodes.

A multilayer ceramic capacitor proposed as such a multilayer ceramic capacitor includes an internal electrode composed of nickel and disposed in a dielectric containing a main component and $Y_2O_3$ added as an additive at a predetermined ratio to MgO, the main component being represented by a composition formula:

$$(1-x-y-z)BaTiO_3 + xCaZrO_3 + yMnO + zMgO$$

wherein $0.003 \leq x \leq 0.023$, $0.005 \leq y \leq 0.030$, and $0.010 \leq z \leq 0.080$.

The multilayer ceramic capacitor can realize excellent characteristics such as a capacitance of about 40 μF or more, an insulation resistance of about 1000 ΩM or more, an electrostatic tangent of about 2.5% or less, and a temperature change within (−55° C. to +125° C.) ±15%.

However, multilayer ceramic capacitors have recently been used under various severe conditions and environments, leading to demand for a multilayer ceramic capacitor excellent in reliability at high temperature and high electric field and reliability at high humidity and high electric field and thus having higher reliability.

SUMMARY OF THE INVENTION

Accordingly, preferred embodiments of the present invention provide a multilayer ceramic capacitor capable of satisfying both reliability at high temperature and high electric field and reliability at high humidity and high electric field.

According to a preferred embodiment of the present invention, a multilayer ceramic capacitor includes a ceramic laminated body including a plurality of dielectric ceramic layers and a plurality of internal electrodes stacked with the dielectric ceramic layers disposed therebetween, and external electrodes disposed on the ceramic laminated body so as to be electrically connected respective ones of the internal electrodes.

The dielectric ceramic layers preferably include a perovskite compound containing Ba and Ti, Zr, and a rare earth element, ratios of Zr and the rare earth element to 100 molar parts of Ti are preferably within a range of, for example, about 0.4 to 2.0 molar parts and a range of about 0.05 to 0.5 molar parts, respectively.

A molar ratio (Zr/rare earth element) of Zr to the rare earth element is preferably within a range of, for example, about 3.3 to 8.0, and Al-containing segregated substances are present in about 80% or more of defective portions which are regions where continuity of the internal electrodes is interrupted, for example.

In the multilayer ceramic capacitor according to the preferred embodiment of the present invention described above, a dielectric ceramic of the dielectric ceramic layers preferably has an average grain diameter within a range of about 230 nm to 350 nm, for example.

When a dielectric ceramic constituting the dielectric ceramic layers has an average grain diameter within a range of about 230 nm to 350 nm, for example, the reliability at high temperature and high electric field is further improved.

A multilayer ceramic capacitor according to an additional preferred embodiment of the present invention preferably includes, as dielectric ceramic constituting dielectric ceramic layers, dielectric ceramic containing a perovskite compound containing Ba and Ti, Zr, and a rare earth element, ratios of Zr and the rare earth element to 100 molar parts of Ti are preferably within a range of, for example, about 0.4 to 2.0 molar parts and a range of about 0.05 to 0.5 molar parts, respectively, and the molar ratio (Zr/rare earth element) is preferably within a range of about 3.3 to 8.0, for example. In addition, Al-containing segregated substances are present in about 80% or more of defective portions which are regions where continuity of the internal electrodes is interrupted, for example. Therefore, the reliability at high temperature and high electric field is greatly improved, and the reliability at high humidity and high electric field is greatly improved, thus providing a multilayer ceramic capacitor having high reliability as a whole.

The expression "Al-containing segregated substances are present in about 80% or more of defective portions" represents that Al-containing segregated substances are present at a ratio of the number of defective portions where Al-containing segregated substances are present to the total number of defective portions in the internal electrodes in a section taken along a stacking direction of the multilayer ceramic capacitor. This is described in detail below with respect to a preferred embodiment of the present invention.

According to another preferred embodiment of the present invention, a multilayer ceramic capacitor includes a ceramic laminated body including dielectric ceramic layers and internal electrodes stacked with the dielectric ceramic layers disposed therebetween, and external electrodes disposed on a predetermined area of the ceramic laminated body so as to be electrically connected to respective ones of the internal electrodes, wherein the dielectric ceramic layers include a perovskite compound including Ba and Ti, the internal electrodes include defective portions interrupting continuity of the internal electrodes, and a proportion P1 determined by a formula $P1 = N1/N2 \times 100$ is about 80% or more, where N1 represents a total number of the defective portions including Al therein, and N2 represents a total number of the defective portions.

Preferably, the dielectric ceramic layers further include Zr and a rare earth element, and ratios of Zr and the rare earth element to 100 molar parts of Ti are within a range of:

Zr: about 0.4 molar parts to about 2.0 molar parts;

the rare earth element: about 0.05 molar parts to about 0.5 molar parts; and a molar ratio (Zr/rare earth element) of Zr to the rare earth element is within a range of about 3.3 to about 8.0.

According to yet another preferred embodiment of the present invention, a multilayer ceramic capacitor includes a ceramic laminated body including dielectric ceramic layers and internal electrodes stacked with the dielectric ceramic layers disposed therebetween, and external electrodes disposed on a predetermined area of the ceramic laminated body so as to be electrically connected to respective ones of the internal electrodes, wherein the dielectric ceramic layers include a perovskite compound including Ba and Ti, Zr, and a rare earth element, and ratios of Zr and the rare earth element to 100 molar parts of Ti are within a range of:

Zr: about 0.4 molar parts to about 2.0 molar parts;

the rare earth element: about 0.05 molar parts to about 0.5 molar parts; and a molar ratio (Zr/rare earth element) of Zr to the rare earth element is within a range of about 3.3 to about 8.0; and the internal electrodes include defective portions interrupting continuity of the internal electrodes, a proportion P1 determined by a formula P1=N1/N2×100 is about 80% or more, where N1 represents a total number of the defective portions including Al therein, and N2 represents a total number of the defective portions, and dielectric ceramic included in the dielectric ceramic layers has an average grain diameter within a range of about 230 nm to about 350 nm.

According to a further preferred embodiment of the present invention, a multilayer ceramic capacitor includes a ceramic laminated body including dielectric ceramic layers and internal electrodes stacked with the dielectric ceramic layers disposed therebetween, and external electrodes disposed on a predetermined area of the ceramic laminated body so as to be electrically connected to respective ones of the internal electrodes, wherein the ceramic laminated body includes a perovskite compound including Ba and Ti, Zr, a rare earth element, Al, Si, Ca, Mn, Mg and V, and ratios of Zr, the rare earth element, Al, Si, Ca, Mn, Mg and V to 100 molar parts of Ti are within a range of:

Zr: about 0.4 molar parts to about 2.0 molar parts;

the rare earth element: about 0.05 molar parts to about 0.5 molar parts;

Al: about 0.2 molar parts to about 1.0 molar parts;

Si: about 0.8 molar parts to about 2.0 molar parts;

Ca: about 0.5 molar parts to about 2.0 molar parts;

Mn: about 0.05 molar parts to about 0.4 molar parts;

Mg: about 0.05 molar parts to about 0.5 molar parts;

V: about 0.1 molar parts to about 0.4 molar parts; and a molar ratio (Zr/rare earth element) of Zr to the rare earth element is within a range of about 3.3 to about 8.0, a molar ratio (Al/Si) of Al to Si is within a range of about 0.15 to about 0.77, the internal electrodes include defective portions interrupting continuity of the internal electrodes, and a proportion P1 determined by a formula P1=N1/N2×100 is about 80% or more, where N1 represents a total number of the defective portions including Al therein, and N2 represents a total number of the defective portions.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
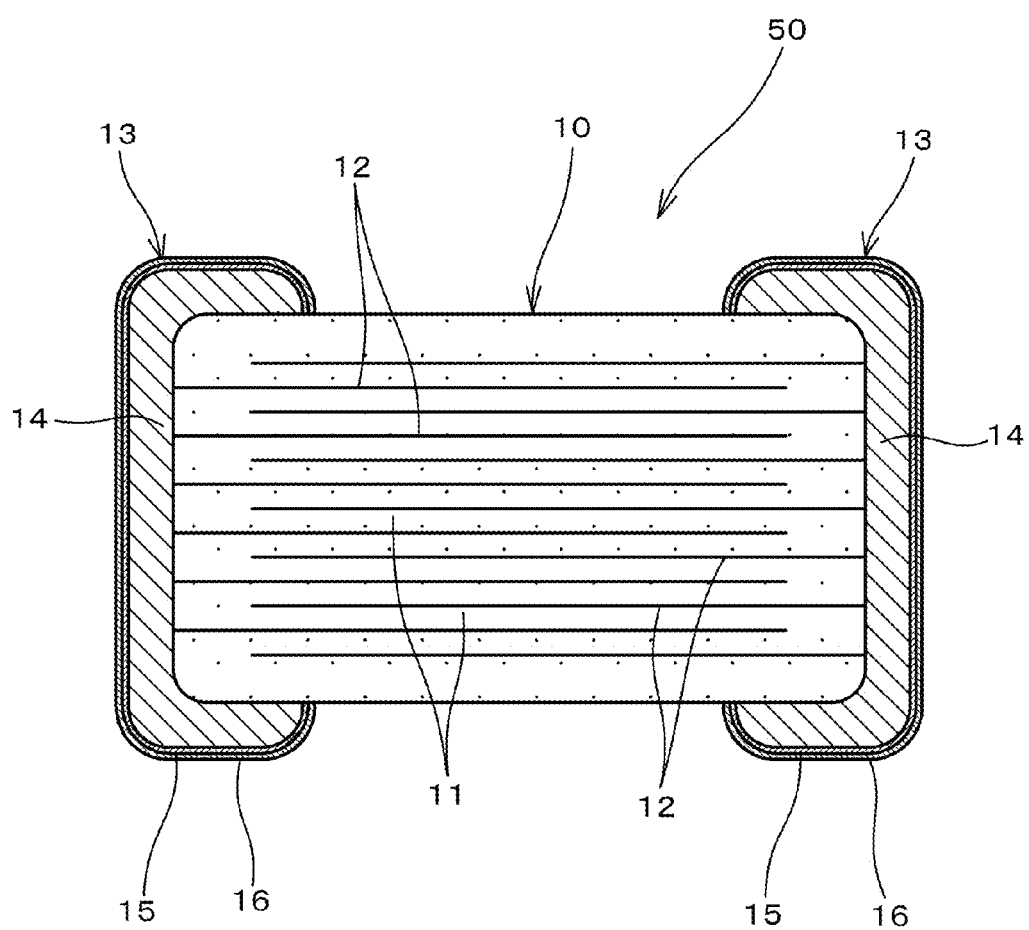
FIG. 1 is a cross sectional view illustrating a configuration of a multilayer ceramic capacitor according to a preferred embodiment of the present invention.

The characteristics of the present invention are described in further detail below with reference to preferred embodiments of the present invention.

A non-limiting example of a method of manufacturing a multilayer ceramic capacitor according to a preferred embodiment of the present invention will be described.

First, high-purity $TiCl_4$ and $Ba(NO_3)_2$ are prepared as starting raw materials and weighed, and then titanyl barium oxalate $(BaTiO(C_2O_4) \cdot 4H_2O)$ is precipitated to produce a precipitate.

The precipitate is decomposed by heating at 1100° C. to synthesize a barium titanate $(Ba_{1.003}TiO_3)$ powder.

Then, the synthesized barium titanate powder is observed at 50,000 times magnification with a scanning electron microscope (SEM).

Then, about 200 grains are randomly extracted from the resultant SEM photograph, the inner area of each of the grains is determined by image analysis, and an equivalent circle diameter is calculated as a grain diameter. A typical value of the grain diameters is calculated to be about 250 nm as a D50 diameter in an area distribution.

Next, $BaCO_3$, $CaCO_3$, $Y_2O_3$, MnO, MgO, $Al_2O_3$, $ZrO_2$, and $V_2O_5$, which have a purity of 99% or more, and colloidal silica containing about 20% by weight of silicon oxide in terms of $SiO_2$ are prepared.

These raw materials are mixed so that in a ceramic laminated body after firing, when a dielectric ceramic layer contains as a main component a perovskite compound containing Ba and Ti, the contents of elements relative to 100 molar parts of Ti preferably are as follows:

Ba content: about 0.5 molar parts

Ca content: about 1.0 molar part

Mn content: about 0.20 molar parts

Mg content: about 0.10 molar parts

V content: about 0.25 molar parts

Si content: about 1.3 molar parts

In addition, Y, Zr, and Al are mixed to have compositions shown in Table 1A and Table 1B.

Additionally, the contents and molar ratio of Si and Al are preferably, but not particularly limited to, with respect to 100 molar parts of Ti, the content f of Si in molar part being $0.8 \leq f \leq 2.0$, the content g of Al in molar part being $0.2 \leq g \leq 1.0$, and a molar ratio (Al/Si) of Al to Si is within a range of about 0.15 to about 0.77. In this case multilayer ceramic capacitor having even superior reliability is obtained.

The raw materials are wet-mixed using a ball mill, dried by evaporation, and then subjected to size regulation to produce a raw material powder.

Zr may be mixed from a boulder used in wet mixing.

A polyvinylbutyral-based binder and ethanol used as an organic solvent are added to the dielectric raw material powder and wet-mixed using a ball mill to produce a ceramic slurry. The ceramic slurry is formed into a sheet by a doctor blade method so that the thickness of a dielectric element after firing is about 3.5 μm, for example, thus forming a rectangular or substantially rectangular ceramic green sheet.

An internal electrode pattern is formed by screen-printing a conductive paste containing Ni on the ceramic green sheet formed as described above in C).

A plurality of the ceramic green sheets are stacked according to procedures described below.

First, a predetermined number of ceramic green sheets (ceramic green sheets for external layers) not having the internal electrode patterns formed thereon are stacked, and 100 ceramic green sheets having the internal electrode patterns formed thereon are stacked on the ceramic green sheets for external layers so that the lead-out directions of the internal electrode patterns adjacent in the stacking direction are opposite to each other. Then, a predetermined number of ceramic green sheets (ceramic green sheets for external layers) not having the internal electrode patterns formed thereon are again stacked to produce a stack.

The resultant stack is debindered by heating at 250° C. in a $N_2$ atmosphere and then fired under conditions described below.

Sample Nos. 1 to 8 satisfying the requirements of the present invention and Sample Nos. 11 to 19 not satisfying the requirements of the present invention are fired in a reducing atmosphere composed of $H_2$—$N_2$—$H_2O$ gas under the following conditions:

Heating rate: about 500° C./min,
Top temperature: about 1200° C. to 1300° C. (in this preferred embodiment, about 1220° C.),
Keep time: about 1 min,
Oxygen partial pressure: $10^{-9}$ to $10^{-10}$ MPa (in this preferred embodiment, $10^{-9}$ MPa)

Then, oxidation is again performed under the conditions including a Top temperature of about 900° C. to 1100° C. (in this preferred embodiment, about 1050° C.) and an oxygen partial pressure of $10^{-12}$ MPa, producing a ceramic laminated body.

After debindering under the conditions described above, Sample Nos. 9 and 10 satisfying the requirements of the present invention are fired in a reducing atmosphere composed of $H_2$—$N_2$—$H_2O$ gas under the following conditions:

Heating rate: about 100° C./min,
Top temperature: about 1200° C. to 1300° C. (in this preferred embodiment, about 1220° C.),
Keep time: about 1 min,
Oxygen partial pressure: $10^{-9}$ to $10^{-10}$ MPa (in this preferred embodiment, $10^{-9}$ MPa)

Then, oxidation is again performed under the conditions including a Top temperature of about 900° C. to 1100° C. (in this preferred embodiment, about 1050° C.) and an oxygen partial pressure of $10^{-12}$ MPa, producing a ceramic laminated body.

Then, a Cu paste containing a $B_2O_3$—$Li_2O_3$—$SiO_2$—BaO-based glass frit is applied to the end surfaces of the resultant ceramic laminated body and baked at a temperature of about 850° C. in a $N_2$ atmosphere to form Cu external electrodes electrically connected to the internal electrodes.

Further, a Ni plating layer is formed to cover each of the formed Cu external electrodes, and a Sn plating layer is further formed to cover the Ni plating layer.

Figure 2:
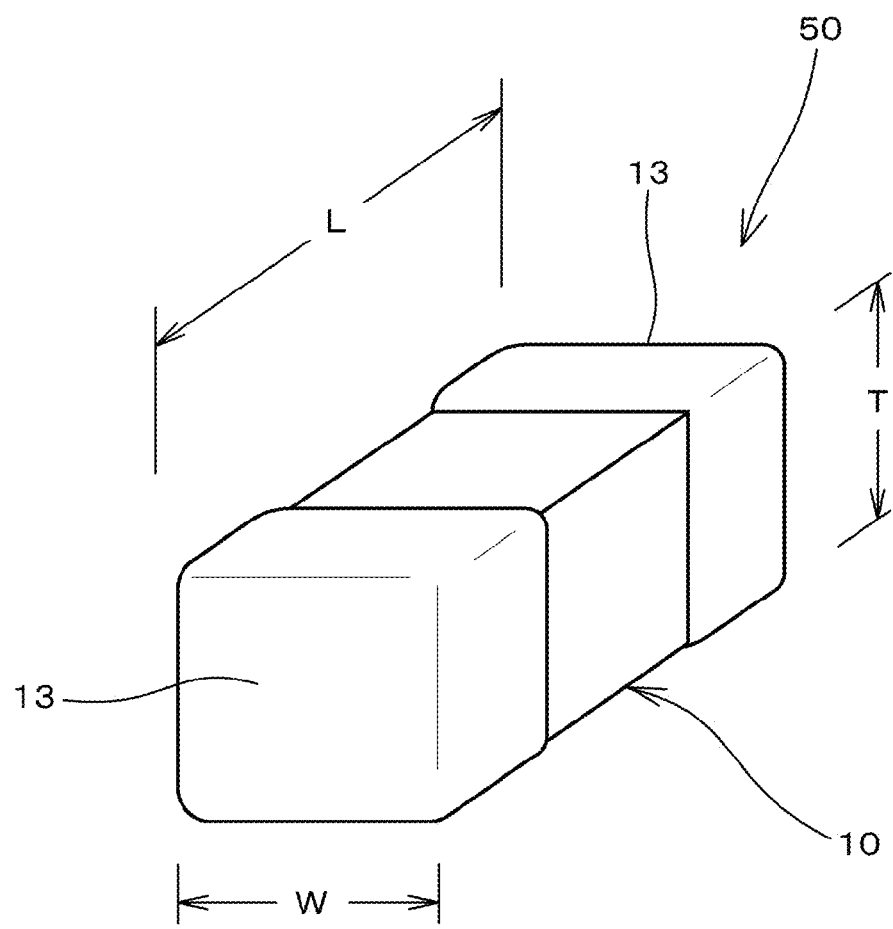
FIG. 2 is a perspective view illustrating a configuration of a multilayer ceramic capacitor according to a preferred embodiment of the present invention.

As a result, a multilayer ceramic capacitor (sample) of each of Sample Nos. 1 to 19 in Table 1A and Table 1B having a structure shown in FIGS. 1 and 2 was produced.

As shown in FIGS. 1 and 2, the multilayer ceramic capacitor 50 has a structure including a ceramic laminated body (capacitor body) 10 which includes a plurality of stacked dielectric ceramic layers 11 and a plurality of internal electrodes 12 disposed at a plurality of interfaces between the dielectric ceramic layers 11, and a pair of external electrodes 13 disposed on both end surfaces of the ceramic laminated body 10 so as to be electrically connected to the internal electrodes 12 which are alternately led out to the opposite end surfaces. The external electrodes 13 have a structure in which a Ni plating layer 15 that covers a Cu external electrode 14 and a Sn plating layer 16 that covers the Ni plating layer 15 are arranged in that order.

The multilayer ceramic capacitor 50 formed by the above-described method preferably has outline dimensions including a length L of about 3.2 mm and a width W of about 1.6 mm, for example, and in FIG. 2, the length is a dimension in the L direction and the width is a dimension in the W direction.

Also, in the multilayer ceramic capacitor 50, the dielectric ceramic layers 11 interposed between the adjacent internal electrodes 12 preferably have an average thickness of about 3.5 μm, and the internal electrodes 12 composed of Ni preferably have an average thickness of about 0.9 μm, for example. In addition, the facing area (effective area) between a pair of the internal electrodes facing each other with the dielectric ceramic layer disposed therebetween preferably is about 3.3 $mm^2$, for example.

Further, after the external electrodes of each of the formed samples were removed, the ceramic laminated body preferably was dissolved with an acid and subjected to inductively coupled plasma (ICP) emission spectroscopy. As a result, it was confirmed that the ceramic laminated body has substantially the same composition regarding Ba, Ti, Ca, Mn, Mg, V and Si as mentioned earlier in the description, and the same composition as shown in Table 1A and Table 1B regarding Y, Zr, and Al except Ni as an internal electrode component.

Additionally, the contents of Ca, Mn, Mg and V in the dielectric ceramic layers are preferably, but not particularly limited to, with respect to 100 molar parts of Ti, the content b of Ca in molar part being 0.5≤b≤2.0, the content c of Mn in molar part being 0.05≤c≤0.4, the content d of Mg in molar part being 0.05≤d≤0.5, the content e of V in molar part being 0.1≤e≤0.4. In this case multilayer ceramic capacitor having even more superior reliability is obtained.

The average thickness of the internal electrodes is preferably, but not particularly limited to, about 0.8 μm or greater, for example.

Five samples (specimens) were prepared for each of Sample Nos. 1 to 19. Then, each of the samples was fractured to expose a surface (WT surface) defined by the width direction (W direction) and the thickness direction (T direction) at about ½ depth in the length L direction.

In order to define boundaries (grain boundaries) between crystal grains of the dielectric ceramic, the fractured sample was heat-treated. The temperature of heat treatment was a temperature which produces no grain growth of crystal grains and defines grain boundaries, and in this preferred embodiment, the temperature preferably was about 1100° C., for example.

Then, crystal grains of the ceramic constituting the dielectric ceramic layers were observed at 50,000 times magnification and photographed with a scanning electron microscope (SEM) at about ½ position in each of the W direction and the T direction of the fracture surface (WT surface).

Then, 200 grains were randomly extracted from the resultant SEM photograph, the area of a portion inside the grain boundary of each of the crystal grains was determined by image analysis, and an equivalent circle diameter was calculated as a grain diameter. A $D_{50}$ diameter was calculated in an area distribution of grain diameters of each of the samples, and an average value of $D_{50}$ diameters was regarded as an "average grain diameter".

Five samples were prepared for each of Sample Nos. 1 to 19. Then, the periphery of each of the samples was fixed with a resin so as to expose a surface (LT surface) defined by the length direction (L direction) and the thickness direction (T direction) of the sample.

Next, the LT surface of the sample was ground with a grinder. In this case, grinding was performed to a depth of about ½ in the width direction (W direction) of the sample to expose a LT surface (LT ground end surface) as a ground surface. Then, after grinding, the ground surface was processed by ion milling in order to remove sagging produced in the internal electrodes by grinding.

Figure 3:
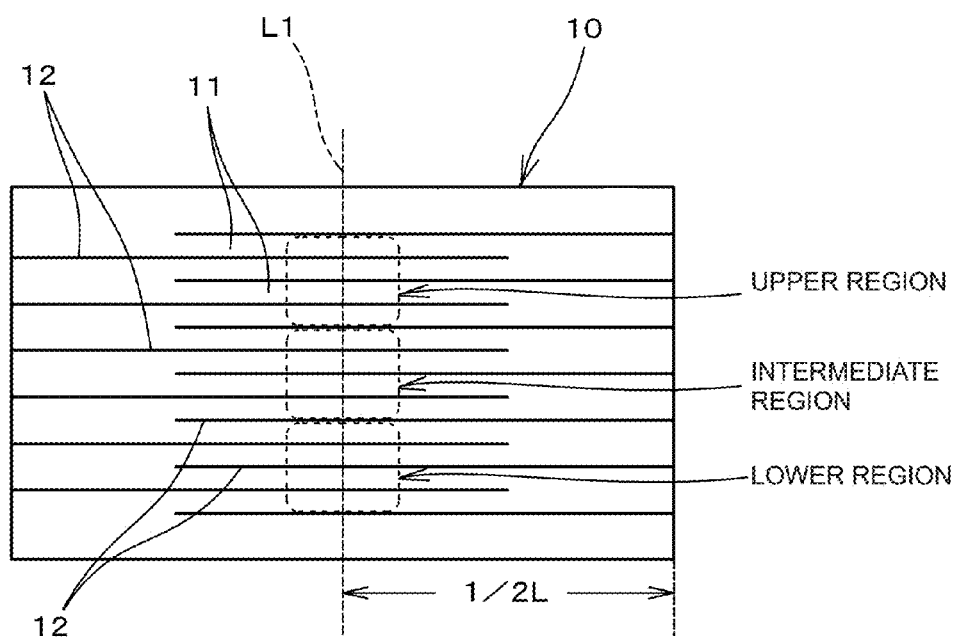
FIG. 3 is a drawing illustrating a method for measuring the number of defective portions in internal electrodes and the number of defective portions where Al-containing segregated substances are present, the defective portions being regions where continuity of the internal electrodes is interrupted in a multilayer ceramic capacitor according to a preferred embodiment of the present invention.

In the ground sample, the thickness of the internal electrode was measured. In measuring the thickness of the internal electrodes, first, as shown in FIG. 3, a straight line L1 was drawn (assumed) to be perpendicular or substantially perpendicular to the internal electrodes 12 at about ½ position in the L direction of the LT ground end surface of the sample.

Next, a region in which the internal electrodes 12 of the sample were stacked was divided into three equal or substantially equal regions including a upper region, an intermediate region, and a lower region in the T direction. The straight line L1 was positioned at about ½ in the L direction of each of the regions.

Then, four layers of the internal electrodes were randomly selected in a portion near the center of each of the regions, and the number of defective portions in the internal electrodes and the number of defective portions where Al-containing segregated substances were present were measured, the defective portions being regions where continuity of the internal electrodes is interrupted. The measurement was performed with FE-WDX, and the width of an observation field was about 25 µm, for example.

Figure 4:
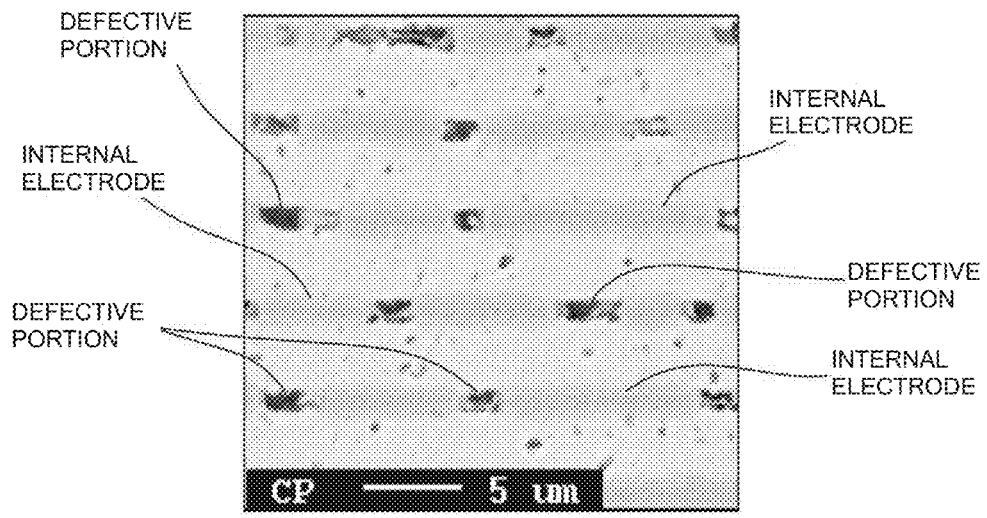
FIG. 4 is a diagram showing a reflection electron image obtained by field emission-wide dispersive X-ray spectroscopy (FE-WDX) of a predetermined region of a multilayer ceramic capacitor according to a preferred embodiment of the present invention.
Figure 5:
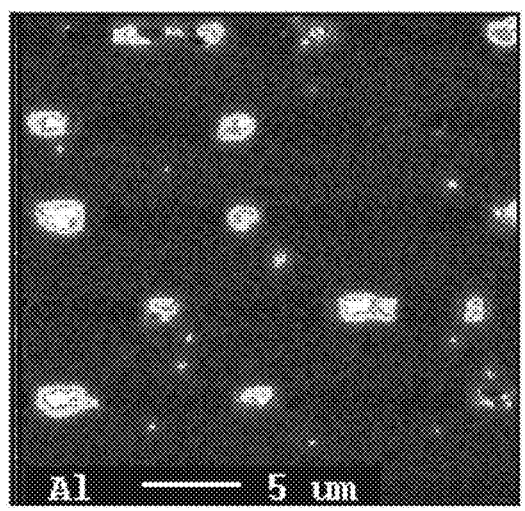
FIG. 5 is a diagram showing an Al mapping image of the region showing the refection electron image shown in FIG. 4 of a multilayer ceramic capacitor according to a preferred embodiment of the present invention.
Figure 6:
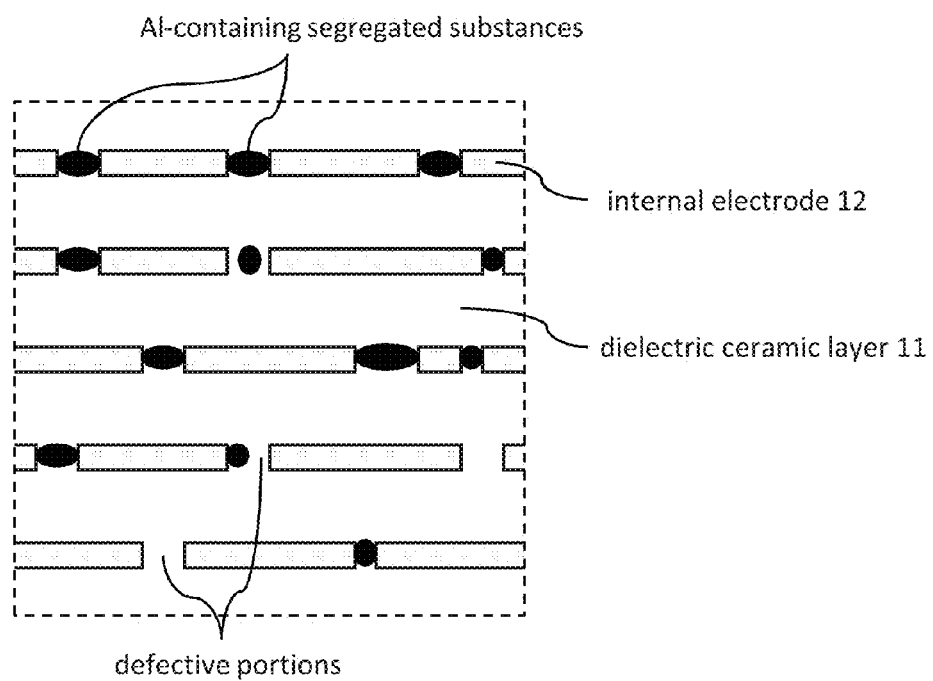
FIG. 6 is an enlarged view of a region shown in FIG. 4 of a multilayer ceramic capacitor according to a preferred embodiment of the present invention.

FIG. 4 shows a FE-WDX reflection electron image of the sample of Sample No. 3 shown in Table 1A, FIG. 5 shows a FE-WDX mapping image of Al in the region showing the reflection electron image shown in FIG. 4 of the same sample of Sample No. 3, and FIG. 6 shows an enlarged view of a region shown in FIG. 4.

The Al mapping image of FIG. 5 indicates that Al was present in the defective portions of the internal electrodes.

The ratio of presence (%) of Al-containing segregated substances is determined by formula (1) below.

Ratio (%) of Al-containing segregated substances present=(number of defective portions where Al-containing segregated substances are present/number (total number) of defective portions in the internal electrodes)×100      (1)

The ratio in which Al-containing segregated substances were present is denoted as P1, and is obtained by the formula P1=N1/N2×100, where N1 represents the total number of locations along the inner electrodes 12 at which a portion of the inner electrodes 12 is absent (i.e., a discontinuity or defective portion is present) and Al-containing segregated substances are present in the defective portion or discontinuity, and N2 represents the total number of locations along the inner electrodes 12 at which a portion of the inner electrodes 12 is absent (i.e., a discontinuity or defective portion is present). As shown in FIG. 6, for example, N1=12 and N2=14.

In Tables 1A and 1B, an average value of the ratios of presence (%) of Al-containing segregated substances determined in the regions by the above formula (1) is shown as "Ratio of Al segregated substances present".

In addition, the content of Al in the Al-containing segregated substances is not particularly limited, but the average molar ratio of the Al content to the component content excluding oxygen in the Al-containing segregated substances is particularly preferably in a range of about 0.1 to 1, for example. The contents were measured by, for example, a method below. First, a total of 20 Al-containing segregated substances present in a portion near the center of each of the regions of the sample were randomly selected. Each of the Al-containing segregated substances was sliced and then the composition was analyzed by a scanning transmission electron microscope (STEM). "JEM-2200FS" manufactured by JEOL, Ltd. was used as STEM, and the acceleration voltage was 200 kV. "JED-2300T" manufactured by JEOL, Ltd. and a silicon drift detector (SDD detector) having an aperture of 60 mm$^2$ was used as an energy dispersive spectrometer (EDS) detector, and "Noran System 7" manufactured by Thermo Fischer Scientific Inc. is used as an EDS system. In addition, the thickness of a thin sample was about 100 nm. The molar ratio of the Al content to the component content excluding oxygen in each of the Al-containing segregated substances was calculated, and the values thereof were averaged.

In addition, the form of Al present in the Al-containing segregated substances is not particularly limited, but, for example, Al preferably is present as an Al oxide, for example.

Also, the capacitance of each of the samples (multilayer ceramic capacitor) of Sample Nos. 1 to 19 in Tables 1A and 1B, which were formed by the above-described method, was measured at 1 kHz-1 Vac. The capacitance was measured for 100 samples (specimens) prepared for each of the samples of Sample Nos. 1 to 19. Then, 50 samples (specimens) having a capacitance value between a first quartile and a third quartile were extracted as samples for a reliability test.

A high-temperature high-electric field load test was conducted by applying a DC voltage of about 25 V for the 50 extracted samples (specimens) in an environment of about 125° C. for each of 1000 hours and 2000 hours. The value of insulation resistance was measured for each of the samples (specimens) while the voltage was applied, and the samples showing an insulation resistance value of about 1 MΩ or less were determined as "poor" in reliability at high temperature and high electric field.

Next, for the samples (Sample Nos. 1 to 10 in Table 1A and Sample Nos. 15 and 16 in Table 1B) which were not confirmed to be "poor" at the time when 1000 hours has passed in the high-temperature high-electric-field load test, 50 samples (specimens) having a capacitance value between a first quartile and a third quartile were prepared by the same method as for extracting 50 samples (specimens) in the high-temperature high-electric-field load test.

Then, a high-humidity high-electric field load test is conducted by applying a DC voltage of about 25 V for the 50 samples (specimens) prepared for each of the samples of Sample Nos. 1 to 10 and Sample Nos. 15 and 16 in an environment at a temperature of about 125° C. and a relative humidity of about 85% RH for 2000 hours. The value of insulation resistance was measured for each of the samples (specimens) while the voltage was applied, and the samples showing an insulation resistance value of about 1 MΩ or less were determined as "poor" in reliability at high humidity and high electric field.

The evaluation results are shown in Tables 1A and 1B.

TABLE 1A

| Sample No. | Y | Zr | Al | Zr/Y | Average grain diameter (nm) | Ratio of Al segregated substances present | high temperature-high electric field test number of defects/number of samples 1000 hr after | high temperature-high electric field test number of defects/number of samples 2000 hr after | high humidity-high electric field test number of defects/number of samples 2000 hr after |
|---|---|---|---|---|---|---|---|---|---|
| 1 | 0.05 | 0.4 | 1.00 | 8.0 | 290 | 94% | 0/50 | 0/50 | 0/50 |
| 2 | 0.20 | 1.5 | 0.50 | 7.5 | 370 | 90% | 0/50 | 3/50 | 0/50 |
| 3 | 0.30 | 1.0 | 0.50 | 3.3 | 260 | 91% | 0/50 | 0/50 | 0/50 |
| 4 | 0.25 | 1.5 | 0.20 | 6.0 | 230 | 80% | 0/50 | 0/50 | 0/50 |
| 5 | 0.25 | 1.5 | 0.50 | 6.0 | 230 | 90% | 0/50 | 0/50 | 0/50 |
| 6 | 0.25 | 1.5 | 1.00 | 6.0 | 350 | 95% | 0/50 | 0/50 | 0/50 |
| 7 | 0.25 | 2.0 | 0.50 | 8.0 | 330 | 96% | 0/50 | 0/50 | 0/50 |
| 8 | 0.50 | 2.0 | 0.50 | 4.0 | 230 | 85% | 0/50 | 0/50 | 0/50 |
| 9 | 0.25 | 1.5 | 0.20 | 6.0 | 400 | 90% | 0/50 | 7/50 | 0/50 |
| 10 | 0.25 | 1.5 | 0.50 | 6.0 | 370 | 92% | 0/50 | 5/50 | 0/50 |

TABLE 1B

| Sample No. | Y | Zr | Al | Zr/Y | Average grain diameter (nm) | Ratio of Al segregated substances present | high temperature-high electric field test number of defects/number of samples 1000 hr after | high temperature-high electric field test number of defects/number of samples 2000 hr after | high humidity-high electric field test number of defects/number of samples 2000 hr after |
|---|---|---|---|---|---|---|---|---|---|
| *11 | 0.01 | 1.5 | 0.50 | 150.0 | 610 | 94% | 30/50 | 44/50 | — |
| *12 | 0.02 | 1.5 | 0.50 | 75.0 | 420 | 71% | 5/50 | 7/50 | — |
| *13 | 0.05 | 0.3 | 1.00 | 6.0 | 240 | 92% | 2/50 | 4/50 | — |
| *14 | 0.25 | 0.6 | 0.50 | 2.4 | 230 | 83% | 2/50 | 3/50 | — |
| *15 | 0.25 | 1.5 | 0.10 | 6.0 | 250 | 62% | 0/50 | 0/50 | 12/50 |
| *16 | 0.25 | 1.5 | 0.15 | 6.0 | 240 | 77% | 0/50 | 0/50 | 2/50 |
| *17 | 0.25 | 3.0 | 0.50 | 12.0 | 390 | 86% | 4/50 | 9/50 | — |
| *18 | 0.50 | 1.5 | 0.50 | 3.0 | 230 | 93% | 3/50 | 6/50 | — |
| *19 | 1.0 | 1.5 | 0.50 | 1.5 | 240 | 85% | 12/50 | 16/50 | — |

Sample Nos. with * are samples out of the range of the present invention.

Tables 1A and 1B confirm that the samples of Sample Nos. 11 to 19 (comparative examples) not meeting the requirements of the present invention cannot satisfy either the reliability at high temperature and high electric field and the reliability at high humidity and high electric field.

On the other hand, it was confirmed that the samples of Sample Nos. 1 to 10 meeting the requirements of the present invention produce multilayer ceramic capacitors satisfying both the reliability at high temperature and high electric field and the reliability at high humidity and high electric field.

However, it was also confirmed that the samples of Sample Nos. 2, 9, and 10 including the dielectric ceramic having an average grain diameter out of the range of about 230 nm to about 350 nm slightly produce defects after the passage of 2000 hours in the high-temperature high-electric-field test. Therefore, in order to secure higher reliability of the multilayer ceramic capacitor of various preferred embodiments of the present invention, the average grain diameter of the dielectric ceramic is more preferably in the range of about 230 nm to about 350 nm, for example.

According to various preferred embodiments of the present invention, a mechanism which permits improvements in both the reliability at high temperature and high electric field and the reliability at high humidity and high electric field is not necessarily clear but is supposed as follows.

Grain growth of a perovskite compound containing Ba and Ti is accelerated by adding Zr to a dielectric ceramic layer. On the other hand, grain growth of the perovskite compound containing Ba and Ti is suppressed by adding a rare earth element. Therefore, it is assumed that the timing and degree of grain growth are controlled by controlling the content ratio between Zr and the rare earth element in a proper range, and thus Al that improves resistance to moisture and the rare earth element that improves reliability are properly distributed.

Also, it is considered that when Al-containing segregated substances are present in defective portions of internal electrodes, entering of moisture is significantly reduced or prevented, resulting in the suppression and prevention of deterioration in insulation resistance.

Further, excessive grain growth of dielectric ceramic decreases the reliability at high temperature and high electric field, but the reliability at high temperature and high electric field is capable of being secured by controlling the average grain diameter of dielectric ceramic in the range of about 230 nm to about 350 nm, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
  a ceramic laminated body including dielectric ceramic layers and internal electrodes stacked with the dielectric ceramic layers disposed therebetween; and external electrodes disposed on a predetermined area of the ceramic laminated body so as to be electrically connected to respective ones of the internal electrodes; wherein the dielectric ceramic layers include a perovskite compound including Ba and Ti, Zr, and a rare earth element;

ratios of Zr and the rare earth element to 100 molar parts of Ti are within a range of:
   Zr: about 0.4 molar parts to about 2.0 molar parts;
   the rare earth element: about 0.05 molar parts to about 0.5 molar parts, and
   a molar ratio (Zr/rare earth element) of Zr to the rare earth element is within a range of about 3.3 to about 8.0;

the internal electrodes include defective portions interrupting continuity of the internal electrodes;

a proportion P1 determined by a formula P1=N1/N2×100 is about 80% or more, where N1 represents a total number of the defective portions including Al therein, and N2 represents a total number of the defective portions; and dielectric ceramic included in the dielectric ceramic layers has an average grain diameter within a range of about 230 nm to about 350 nm.

2. A multilayer ceramic capacitor comprising:

a ceramic laminated body including dielectric ceramic layers and internal electrodes stacked with the dielectric ceramic layers disposed therebetween; and external electrodes disposed on a predetermined area of the ceramic laminated body so as to be electrically connected to respective ones of the internal electrodes; wherein the ceramic laminated body includes a perovskite compound including Ba and Ti, Zr, a rare earth element, Al, Si, Ca, Mn, Mg and V;

ratios of Zr, the rare earth element, Al, Si, Ca, Mn, Mg and V to 100 molar parts of Ti are within a range of:
   Zr: about 0.4 molar parts to about 2.0 molar parts;
   the rare earth element: about 0.05 molar parts to about 0.5 molar parts;
   Al: about 0.2 molar parts to about 1.0 molar parts;
   Si: about 0.8 molar parts to about 2.0 molar parts;
   Ca: about 0.5 molar parts to about 2.0 molar parts;
   Mn: about 0.05 molar parts to about 0.4 molar parts;
   Mg: about 0.05 molar parts to about 0.5 molar parts;
   V: about 0.1 molar parts to about 0.4 molar parts;

a molar ratio (Zr/rare earth element) of Zr to the rare earth element is within a range of about 3.3 to about 8.0;

a molar ratio (Al/Si) of Al to Si is within a range of about 0.15 to about 0.77;

the internal electrodes include defective portions interrupting continuity of the internal electrodes; and a proportion P1 determined by a formula P1=N1/N2×100 is about 80% or more, where N1 represents a total number of the defective portions including Al therein, and N2 represents a total number of the defective portions.

\* \* \* \* \*